US009462382B2

(12) United States Patent
Jones et al.

(10) Patent No.: US 9,462,382 B2
(45) Date of Patent: Oct. 4, 2016

(54) AUDIO SYSTEM

(71) Applicant: Jaguar Land Rover Limited, Coventry (GB)

(72) Inventors: Matt Jones, Coventry (GB); Lukasz Stepek, Coventry (GB); John Cockroft, Coventry (GB)

(73) Assignee: Jaguar Land Rover Limited (GB)

( * ) Notice: Subject to any disclaimer, the term of this patent is extended or adjusted under 35 U.S.C. 154(b) by 22 days.

(21) Appl. No.: 14/384,288

(22) PCT Filed: Mar. 7, 2013

(86) PCT No.: PCT/EP2013/054618
§ 371 (c)(1),
(2) Date: Sep. 10, 2014

(87) PCT Pub. No.: WO2013/135559
PCT Pub. Date: Sep. 19, 2013

(65) Prior Publication Data

US 2015/0023521 A1 Jan. 22, 2015

(30) Foreign Application Priority Data

Mar. 12, 2012 (GB) .................................. 1204324.6

(51) Int. Cl.
*H04B 3/00* (2006.01)
*H04R 3/12* (2006.01)
(Continued)

(52) U.S. Cl.
CPC ................ *H04R 3/12* (2013.01); *H04R 3/005* (2013.01); *H04R 3/04* (2013.01); *G10H 2210/155* (2013.01); *G10H 2240/061* (2013.01); *H04R 2420/01* (2013.01)

(58) Field of Classification Search
CPC .... H04R 3/12; H04R 3/005; H04R 2420/01; H04R 3/04; G10H 2210/155; G10H 2240/061
USPC ..................................................... 381/80, 86
See application file for complete search history.

(56) References Cited

U.S. PATENT DOCUMENTS

2008/0317257 A1 12/2008 Furge et al.

FOREIGN PATENT DOCUMENTS

EP 1 860 918 A1 11/2007
EP 2 268 057 A1 12/2010

(Continued)

OTHER PUBLICATIONS

Communication pursuant to Article 94(3) EPC, European Patent Application No. 13 707 884.6, Sep. 29, 2015, 5 pages.

(Continued)

*Primary Examiner* — Vivian Chin
*Assistant Examiner* — Ammar Hamid
(74) *Attorney, Agent, or Firm* — Myers Bigel & Sibley

(57) ABSTRACT

An audio system for reproducing audio signals comprising a signal processor, the signal processor having at least two processing channels and thereby the signal processor being configured to receive at least two separate audio signals and the signal processor configured to automatically select, in dependence upon the identity of each of the at least two audio signals assigned to the at least two processing channels, processing settings appropriate for each of the at least two audio signals assigned to the at least two processing channels that are for use by the signal processor in independently processing each of the at least two audio signals in each of the processing channels prior to combining said at least two audio signals and the audio system being configured to change the processing settings for a processing channel in response to a change in the identity of the audio signal assigned to that processing channel.

22 Claims, 4 Drawing Sheets

(51) Int. Cl.

| | |
|---|---|
| ***H04R 3/00*** | (2006.01) |
| ***H04R 3/04*** | (2006.01) |
| *H04B 1/00* | (2006.01) |

(56) References Cited

FOREIGN PATENT DOCUMENTS

| | | | | |
|---|---|---|---|---|
| EP | 2 611 213 | A1 | 7/2013 | |
| JP | 2000-047677 | | 2/2000 | |
| JP | 2007-533191 | A | 11/2007 | |
| JP | 2009-049838 | | 3/2009 | |
| JP | 2010-034983 | | 2/2010 | |
| JP | 2010152153 | A | 7/2010 | |
| JP | EP 2268057 | A1 * | 12/2010 | ........... G10H 1/0058 |
| JP | 2011-091470 | | 5/2011 | |
| WO | WO 2005/099252 | A1 | 10/2005 | |
| WO | WO 2007/040791 | A1 | 4/2007 | |
| WO | WO 2007/143373 | A2 | 12/2007 | |
| WO | WO 2009/029471 | A1 | 3/2009 | |
| WO | WO 2009/070699 | A1 | 6/2009 | |

OTHER PUBLICATIONS

Brungart et al., "Design Considerations for Improving the Effectiveness of Multitalker Speech Displays," Proceedings of the 2002 International Conference on Auditory Display, Kyoto, Japan, Jul. 2-5, 2002, pp. ICAD02-1-ICAD02-7.

Combined Search and Examination Report, Application No. GB1304104.1, Jul. 29, 2013, 9 pages.

Reiss, Joshua D., "Intelligent Systems for Mixing Multichannel Audio," 2011 17$^{th}$ International Conference on Digital Signal Processing, Jul. 6, 2011, pp. 1-6.

International Search Report, PCT/EP2013/054618, May 28, 2013, 4 pages.

Combined Search and Examination Report, Application No. GB1204324.6, Jul. 10, 2012, 7 pages.

Office Action Summary, Japanese Patent Application No. 2014-561372, Dec. 22, 2015, 5 pages.

* cited by examiner

AUDIO SYSTEM

RELATED APPLICATIONS

This application is a 35 U.S.C. §371 national stage application of PCT Application No. PCT/EP2013/054618, filed on Mar. 7, 2013, which claims priority from Great Britain Patent Application No. 1204324.6, filed Mar. 12, 2012, the contents of which are incorporated herein by reference in their entireties. The above-referenced PCT International Application was published in the English language as International Publication No. WO 2013/135559 A1 on Sep. 19, 2013.

FIELD OF THE INVENTION

The present invention relates to an apparatus for an audio system and an audio system that processes and plays audio signals of different types and particularly, but not exclusively, to an apparatus for an audio system and an audio system installed in a vehicle. Aspects of the invention relate to an audio system, to an apparatus, to a vehicle, to a program and to a method of processing audio signals.

BACKGROUND OF THE INVENTION

Many vehicles have audio systems that can reproduce sound into the vehicle cabin. The types of audio played into a vehicle cabin can be categorised as background sources and foreground sources. The background sources are typically entertainment-type sources, for example music from an AM/FM radio, an MP3 player or a CD player that may be continually playing in the background. The foreground sources are typically information-type sources for example announcements from a navigation system, a call from a telephone or a beep from a parking aid system that may be output intermittently or less frequently in order to impart information to the driver as required.

The quality of the sound output by an audio system is dependent upon a number of factors including: the quality of the input sound signals; the environment in which the sound is being played; the number of audio channels being simultaneously output; and the type of audio signals being simultaneously output. Modern audio systems use a single equalisation of one or more mixed audio signals to compensate for the factors that degrade the quality of the output audio.

In many current audio systems the single equalisation used by the audio system to process the incoming audio signals uses settings to optimise only the background source. For example, when an audio signal from a background source (for example music from a CD) is being output through a current audio system and it is required to simultaneously also output the audio signal from a foreground source, (for example a beep from a parking aid sensor), the foreground audio signal is mixed with the background audio signal and then the combined signal equalised using an equalisation setting that is characterised for the CD audio. This can be disadvantageous because the equalisation setting for the CD audio signal may not optimise the parking aid beep. Indeed in some instances, not only is the foreground audio not optimised, but the foreground audio signal can in fact be degraded (sometimes to a critical level) by the equalisation that is applied. For example, the parking sensor may issue a beeping signal at a specific frequency to alert the driver to a nearby object in the path of the parking vehicle. The equalisation setting for the background audio may include a filter for the same specific frequency range in order to compensate for the CD audio having an unwanted peak in that specific frequency range. Therefore, when the background audio and foreground audio signals are together subject to the equalisation settings specific to the CD audio signal, the foreground audio may be reduced to an unsatisfactory level or rendered entirely inaudible.

Additionally, current audio systems are limited in the number of audio signals they can output simultaneously and are limited in the number of audio sources they can support. Typically current high-specification audio systems for vehicles may be limited to simultaneously playing three foreground audio signals mixed with one background audio signal. Even in these audio systems, some combinations of background and foreground source audio signal can be hard to hear due to the effects of the background source equalisation being applied to the combined audio signal comprising the background source audio signal and the three concurrent foreground source audio signals.

Furthermore, the number of devices that need to issue information signals to a vehicle user is increasing and current audio systems do not meet the demand to simultaneously output high-quality sounds from a variety of audio sources.

In addition, current audio systems are limited to playing only one background audio source at a time. Typically this has been sufficient because a driver of a vehicle would not want to listen to the radio and a CD at the same time. However, demand is increasing for passenger entertainment and some vehicles are now provided with rear seat screens and DVD players for example. Current in-car audio systems do not accommodate a requirement to play more than one background audio sound.

There is a need for an improved audio system that can accommodate the increasing requirements for multiple audio signals to be supported and output at the same time and at high quality.

It is against this background that the present invention has been conceived. Embodiments of the invention seek to provide an improvement in the field of audio systems. The present invention is not limited in its application to vehicles, but has particular application in vehicles due to the increasing number and increasing type of audio signal that a driver and its passengers wish to listen to, for example: radio (digital and/or analogue), CDs, DVDs, MP3 players, mobile telephones, satellite navigation system, traffic announcement devices, and vehicle warning sounds. The invention may be utilised in applications other than in vehicles, for example it is foreseen that the invention may have application in buildings for example houses, where there are also many different types of audio signal and it may be desirable to output all of them through a single audio system. Furthermore it is envisaged that the present invention may find advantageous application in other devices where management and output of multiple audio signals is carried out, for example phones, smart phones, personal and/or tablet computers, games, hand held devices, consoles and home entertainment audio/visual systems.

SUMMARY OF THE INVENTION

Aspects of the invention provide an audio system, an apparatus (that may also be referred to as an amplifier), a method of processing audio signals, a program, a vehicle and other devices as claimed in the appended claims.

According to another aspect of the invention for which protection is sought there is provided an audio system for reproducing audio signals comprising a signal processor, the signal processor having at least two processing channels and thereby being configured to receive at least two separate audio signals and the signal processor being configured to automatically select, in dependence upon the identity of each of the at least two audio signals assigned to the at least two processing channels, processing settings appropriate for each of the at least two audio signals assigned to the at least two processing channels that are for use by the signal processor in independently processing each of the at least two audio signals in each of the processing channels prior to combining at least two of said at least two audio signals and the audio system being configured to change the processing settings for a processing channel in response to a change in the identity of the audio signal assigned to that processing channel.

In this way audio signals are dynamically assignable, in real-time to processing channels and settings for the processing channels are dynamically assignable, in real-time, to the processing channels. As such the audio system is re-configurable in real-time, so that it can respond to requests to play audio sources selected from a high number of potential audio sources and can yet tailor the processing performed on each selected audio signal to optimise its quality, to take account of environmental factors.

Optionally, each of the appropriate processing settings defines the filtering characteristics of one or more filters of an equalisation sub-block used by the signal processor in independently processing each of the at least two audio signals to adapt the frequency response of the audio signal, such that each of the at least two audio signals is subjected to equalisation processing according to its type and/or source.

Optionally, the at least two audio signals may be labelled so that the audio system is capable of determining the identity of the audio signal and wherein the audio system uses the label to select the appropriate processing settings.

Optionally, the audio system may comprise: two or more audio sources for generating the at least two audio signals; and one or more memories accessible by the signal processor for storing processing settings appropriate to the two or more audio sources and/or to the identity of the at least two audio signals generated by the audio sources.

Additionally or alternatively, each of said at least two processing channels comprises a processing block and wherein the signal processor is configured to retrieve two or more processing settings from the one or more memories, which two or more processing settings are usable by the respective processing blocks of the at least two processing channels for independently processing the audio signals assigned to the at least two processing channels.

Optionally, the processing block of each processing channel may comprise a sequence of sub-blocks, which sequence of sub-blocks may comprise any one or more or a combination of: a dynamic equalisation control (DEC) block; a filter block; a subwoofer extraction block; a delay block; a telephone expander block; a gain block; a surround sound decoder; and a bandwidth expander block.

The processing block of each processing channel may comprise a sequence of filter sub-blocks and wherein the processing settings for each of the processing blocks may determine: the number of filter sub-blocks; the type of filter sub-blocks; the order of the sequence of the filter sub-blocks; and/or the characteristics of the filters of the sub-blocks.

Optionally, the audio system may comprise a plurality of speakers, wherein the at least two audio signals, after processing, are modified audio signals and the modified audio signals are combined before being issued to and reproduced by at least one of the plurality of speakers of the audio system.

Optionally the audio system may comprise an audio controller unit configured to couple each of the at least two audio sources to one of the at least two processing channels of the signal processor and wherein the audio system is configured to dynamically assign an audio source to a processing channel of the signal processor in response to requests received by the audio system to reproduce audio signals from the audio sources.

Optionally the signal processor may comprise a finite maximum number of processing channels and wherein the number of audio sources connected to the audio system via the audio controller exceeds the maximum number of processing channels.

Optionally the audio controller is configured to select, from said requests to reproduce audio signals, which audio signals will be reproduced by the audio system and is configured to assign those selected audio signals to respective ones of the at least two processing channels.

Optionally the identity of an audio signal comprises information relating to the type and/or source and/or quality of the audio signal and wherein the identity is determined by recognition of the type or format of the audio signal; recognition of the source of the audio signal; and/or reading an identifier contained in a header of a digital audio signal.

According to a further aspect of the invention for which protection is sought there is provided a method of processing at least two audio signals, the method comprising:

(i) receiving at least two separate audio signals;
(ii) assigning each of the at least two separate audio signals to one of at least two processing channels;
(iii) automatically selecting, in dependence upon the identity of the at least two audio signals assigned to the at least two processing channels, appropriate processing settings for each of the at least two audio signals of each processing channel;
(iv) independently processing each of the at least two audio signals using the processing settings prior to combining at least two of said at least two audio signals; and
(v) automatically changing the selection of the processing settings for a processing channel in response to a change in the identity of audio signal assigned to that processing channel.

Optionally, the method may comprise identifying the at least two audio signals by the type and/or source of the audio signal and wherein the method may comprise each of the processing settings may define the filtering characteristics of one or more filters of an equalisation sub-block that is appropriate to the type and/or source and/or quality of an audio signal supported by the audio system such that each of the at least two audio signals is subjected to equalisation processing according to its type and/or source and/or quality.

Optionally, each of said at least two processing channels may comprise a processing block and wherein the two or more appropriate processing settings are used in respective processing blocks of the at least two processing channels for independently processing the audio signal assigned to each of the at least two processing channels.

Additionally or alternatively, the method of processing at least two audio signals may comprise configuring the processing block of each processing channel with a sequence of sub-blocks, which sequence of sub-blocks comprises any one or more or a combination of: a dynamic equalisation control (DEC) block; a filter block; a subwoofer extraction block; a delay block; a telephone expander block; a gain block; a surround sound decoder; and a bandwidth expander block.

Optionally, configuring a processing block may comprise arranging a sequence of filter sub-blocks according to the processing settings selected for the processing block which determine: the number of filter sub-blocks; the type of filter sub-blocks; the order of the sequence of the filter sub-blocks; and/or the characteristics of the filters of the sub-blocks.

According to yet another aspect of the invention for which protection is sought there is provided an apparatus, optionally for use in the audio system according to the relevant preceding paragraphs or for carrying out the method according to the relevant preceding paragraphs. The apparatus may be an amplifier. The apparatus comprising a signal processor having at least two processing channels and a program executable by the signal processor, the program configured such that when running on the signal processor, the signal processor is configured to:

(i) receive at least two separate audio signals in separate ones of the at least two processing channels;
(ii) automatically select, based upon the identity of the at least two audio signals assigned to the at least two processing channels, appropriate processing settings for each of the at least two audio signals;
(iii) independently process each of the at least two audio signals using the selected processing settings before combining the at least two audio signals; and
(iv) automatically change the selection of the processing settings for a processing channel in response to a change in the identity of the audio signal assigned to that processing channel.

Optionally the apparatus is configured for connection to a plurality of audio sources and wherein the connection(s) to the audio sources may be any one or a combination of wired and wireless connections.

According to a further aspect of the invention for which protection is sought there is provided a program for use in the audio system according to the relevant preceding paragraphs or for carrying out the method according to the relevant preceding paragraphs, the program configured such that when running on the audio system, the signal processors is configured to:

(i) receive at least two separate audio signals in separate ones of at least two processing channels;
(ii) automatically select in dependence upon the identity of the at least two audio signals assigned to the at least two processing channels, appropriate processing settings for each of the at least two audio signals;
(iii) independently process each of the at least two audio signals using the selected processing settings; and
(iv) automatically change the selection of the processing settings for a processing channel in response to a change in the identity of the audio signal currently assigned to that processing channel.

Optionally the program is configured to determine the type and/or source of each audio signal assigned to a processing channel and configured to obtain processing settings appropriate to the type and/or source of each audio signal assigned to a processing channel by recalling data from one or more memories associated with the audio system or by referring to data held in one or more look-up tables contained in said program, in an auxiliary program or in one or more memories associated with the audio system.

Optionally a plurality of internal audio sources and/or ports for external audio sources are coupled to a network within the vehicle, wherein an audio controller is coupled to the network for selecting which of one or more requests to reproduce an audio signal from the internal or external audio sources will be accepted and for assigning the audio signal associated with each accepted request to a separate processing channel of the signal processor of the audio system. An internal audio source may refer to an audio source disposed within the vehicle, for example an in-car CD player, in-car DVD player and an in-car radio. An external audio source may refer to a portable device that can be coupled to the audio system and may include, for example, an MP3 player, iTunes player and portable radio.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments unless such features are incompatible.

BRIEF DESCRIPTION OF THE DRAWINGS

Embodiments of the invention will now be described, by way of example only, with reference to the accompanying drawings, in which.

Figure 1:
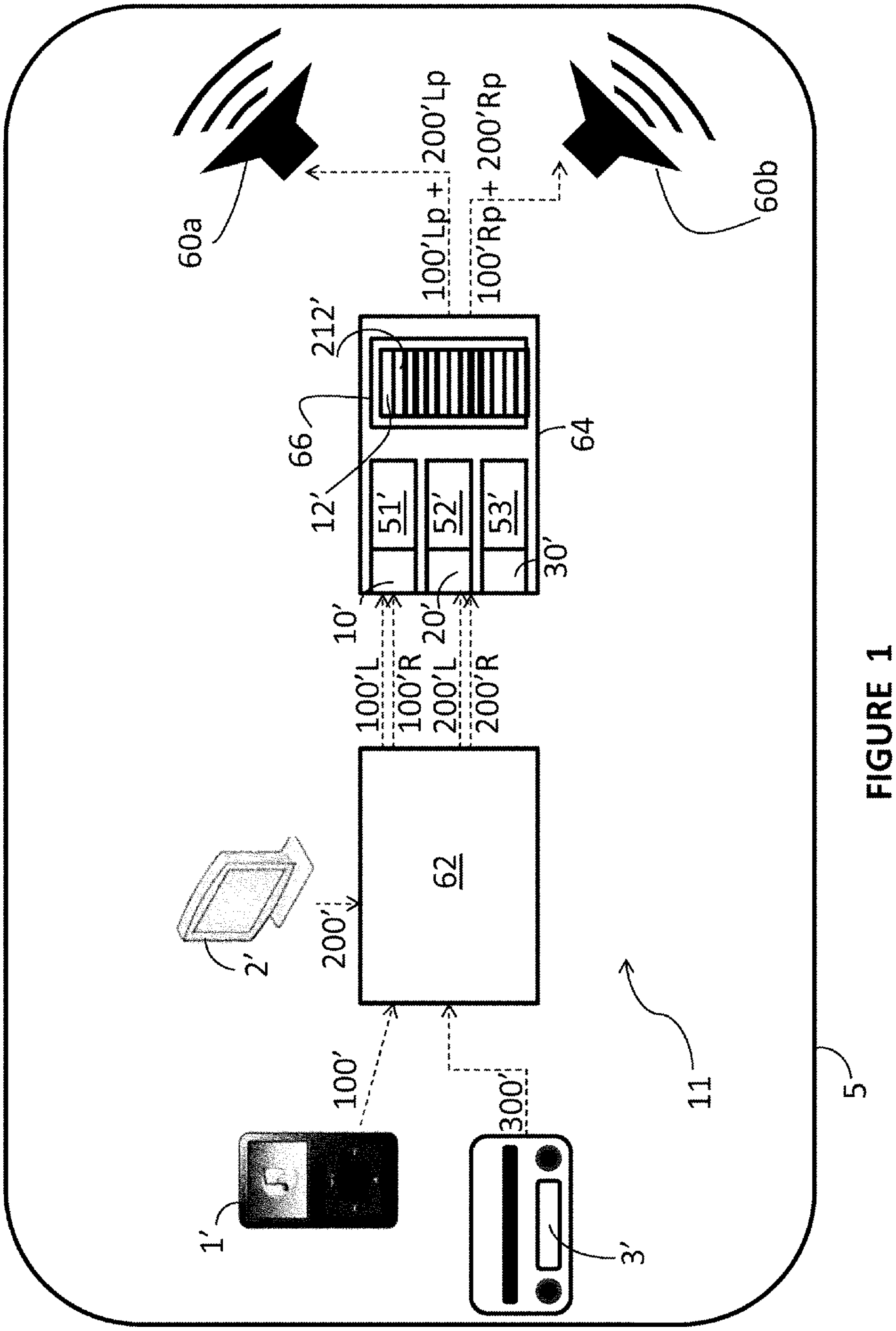
FIG. 1 is a diagram of a vehicle cabin that includes an audio system.

The following table provides a brief description of the features referenced in the accompanying figures.

TABLE 1.1

| Brief Description of Reference Features shown in the accompanying drawings | | | |
|---|---|---|---|
| Brief Description of Feature | Reference numeral | Brief Description of Feature | Reference numeral |
| Audio system | 11 | Audio controller unit | 62 |
| Listening Space | 5 | Incoming Audio signal from audio source 1-7 | 100', 200', 300', 100, 200, 300, 400, 500, 600, 700 |
| Speakers | 60a, 60b | Processing channels of signal processor | 10', 20', 30', 10, 20, 30, 40, 50, 60, 70 |
| Audio source | 1', 2', 3', 1, 2, 3, 4, 5, 6, 7 | Settings | 12', 212', 12, 212, 312, 412, 512, 612, 712, 42 |
| Signal Processor | 64 | Processing block | 51', 52', 53', 51, 52, 53, 54, 55, 56, 57, 58 |
| Signal Processor memory | 66 | Telephone - voice expander block | 34 |
| Fade and balance block | 14 | Delay block | 22, 40 |
| Dynamic equalisation control block | 16, 36 | Gain block | 24, 41 |
| Equaliser Block | 18, 38 | Mixing block | 26', 26 |
| Sub-woofer extraction block | 21 | | |

DETAILED DESCRIPTION OF EMBODIMENTS

Detailed descriptions of specific embodiments of the audio system and a vehicle comprising an audio system of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the audio system and a vehicle comprising an audio system described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

FIG. 1 illustrates an audio system 11 according to an embodiment of the invention in an example environment or listening space 5. In FIG. 1 the example environment 5 is a cabin of a vehicle. In other envisaged applications the environment 5 may be a room in a building such as a house or office or the environment may be outside where the audio system 11 may be deployed in a mobile device, for example: a hand held smart phone, laptop or games console. The audio system 11 may be any system capable of providing audio content from more than one audio source 1', 2', 3'. In the audio system 11 depicted in FIG. 1, the audio system 11 comprises three audio sources 1', 2', 3'. In the embodiment illustrated in FIG. 1, the audio system 11 comprises: a media device such as an iPod® or MP3 player 1'; a satellite navigation system 2'; and a compact disc player 3'. In other envisaged embodiments the audio system 11 may comprise a plurality of audio sources for example any two or more of: an AM/FM radio; a DAB radio; a CD player; an MP3 player; a satellite navigation system; an optical disc player (e.g. a Blu Ray Disc® player, a DVD player, a China Blu player, a CD player); video games player; internet device; a camera; a video camera; a touch screen; a heads-up display; a telephone; alarm system; media management system; a diagnostics system; a conversation assisting device; a message and/or email alert system; and a parking aid system (these are examples and represent a non-exhaustive list of the types of device that the audio system 11 may support). The audio system 11 also comprises one or more speakers 60*a*, 60*b*, an audio controller unit 62 and a signal processor 64.

The audio controller unit 62 may be any computing device capable of network management that can receive (by wired and/or wireless connection) a plurality of different types of audio and/or video signals. The audio controller unit 62 may operate in association with a memory to execute instructions stored in the memory optionally in the form of a program or algorithm. The instructions may provide some of the functionality of the audio system 11. The signal processor 64 may be any computing device capable of processing audio and/or video signals, for example a computer processor or a digital signal processor. The signal processor 64 may form an integral part of the controller unit 62 or may be a separate device. The signal processor 64 may operate in association with a memory to execute instructions stored in the memory, optionally in the form of a program or algorithm. The instructions may provide some of the functionality of the audio system 11. Alternatively, or additionally, the signal processor 64 may operate in association with the memory of the controller unit 62. The signal processor may comprise two or more processing channels 10', 20', 30'. Additionally or alternatively, the audio system 11 may comprise two or more signal processors 64. The memory comprised in either or both of the audio controller unit 62 and signal processor(s) 64 may take many and various forms and may be made up of more than one type of data storage device, for example: magnetic memory, electronic memory and virtual memory. Other suitable types of memory may be used.

The speakers 60*a*, 60*b* may be any form of device capable of translating electrical audio signals into audible sounds. The speakers 60*a*, 60*b* may include one or more of: primary spatial speakers, (for example: left (L), right (R), front-left (FL), front-centre (FC), front-right (FR), rear-left (RL), rear-centre (RC), rear-right (RR)) headphones, subwoofer speakers and surround sound speakers. Communication between the signal processor 64 and/or audio controller unit 62 may be via a hardwired connection and/or may be via a wireless connection (for example Wi-Fi®, Blue Tooth®, infra-red and WhiteFire®).

During operation, audio signals 100', 200', 300' are generated by the audio sources 1', 2', 3'; managed by the audio controller unit 62; assigned to separate processing channels 10', 20', 30' of the signal processor 64; processed by the signal processor 64; and used to drive one or more speakers 60*a*, 60*b*. The assignment of an audio signal 100', 200', 300' is determined by a variety of factors, which may include the availability of any of the processing channels 10', 20', 30'; and a priority rating of an audio signal 100', 200', 300'. As such audio source 100' can be assigned to any of the processing channels 10', 20', 30' and does not necessarily have to be assigned to any processing channel in particular.

The speakers 60*a*, 60*b* of the audio system 11 may comprise a plurality of audio transducers, each capable of receiving an independent and possibly unique audio output signal (100'Lp+200'Lp; 100'Rp+200'Rp) from the signal processor 64. Accordingly, the audio system 11 may operate to produce mono, stereo or surround sound using any suitable number of speakers. Therefore, where reference is made to an audio signal or one audio signal, this may mean a single mono audio signal and/or an audio signal comprising separate channels intended for a plurality of speakers, including spatially different speakers (for example, left, centre, and right, front and rear speakers) and including frequency dependent speakers (for example woofer, subwoofer and tweeter speakers). The audio system 11 is configured so that it may transmit different audio output signals to different speakers. For example, separate, independent and optionally different audio output signals may be issued to: all the primary speakers in the cabin; only to the front speakers; only to the rear speakers; only to the front left speaker; only to the front right speaker; only to the rear left speaker; only to the rear right speaker and/or to one or more headsets or headphones. In other words, the audio system 11 may optionally be configured to support a multi-channel audio signal having x.y components or signals wherein x reflects the number of full range audio channels and y reflects the number of limited/low frequency effects (LFE) channels, for example, 2.1 sound (two full range audio channels and one low frequency audio channel); 5.1 surround sound (five full range audio channels and one low frequency audio channel); and 7.1 surround sound (seven full range audio channels and one low frequency audio channel).

The audio controller unit 62 may be configured to receive the audio signals 100', 200', 300' directly and/or via a network. The network may, for example, be a LAN (Local Area Network) and/or a WAN (Wide Area Network). A WAN may be applicable where the audio system 11 is coupled to a remote computer for enabling, for example, internet access, access to a music storage cloud, access to other virtual audio storage systems and access to any other web based information providing systems such as a web based navigation system. The audio controller unit 62 may be configured to execute instructions to determine which of a plurality of received audio signals 100', 200', 300' from the two or more audio sources 1', 2', 3' can and should be con-currently output by the audio system 11.

In other embodiments it is envisaged that the audio system 11 may be able to support a considerable number of audio sources (for example sixty-four or more or less), which may optionally include any one or more of: a telephone control unit; a heads up display; a flat screen; a touch screen; a camera; a card reader; a multimodal HMI (Human Machine Interface) Device; an optical drive (e.g. a DVD player, a Blu Ray Disc® player, a China Blu player); an AVIO (Audio Visual Input Output) Panel for connecting hand held devices to the system; a vehicle diagnostic system; a parking aid system; a traffic navigation system and a traffic announcement system, a CD player, an AM/FM radio and a digital radio. An additional exemplary and non-limiting illustrative example is provided with reference to FIG. 4 (described below) in which the audio system is configured to output up to seven audio signals simultaneously and may select the output audio signals from a large number (for example hundreds) of input audio signals. It will be recognised that the audio system is capable of outputting a finite maximum number of audio signals to the speakers and is capable of supporting or being connected to a significantly greater number of audio sources.

Due to limitations of speakers 60*a*, 60*b*, audio signals 100', 200', 300' are not normally reproduced by speakers or headphones evenly across the human hearing range and without degradation from, for example: noise, crossover, delay and distortion. The limitations of the speakers 60*a*, 60*b* may be due to the audio transducers not reproducing sound evenly and completely across the spectral bandwidth of an audio signal and/or due to the effect of the audio source type (which may itself, for example pre-boost, filter or compress the generated audio signals). Furthermore the medium through which an audio signal is transmitted from the source through to the speakers 60*a*, 60*b* may not transmit all frequencies at an even rate and compensation for the effect on the acoustic spectrum of a signal may be required.

The signal processor 64 is therefore provided to: optionally restrict the spectral content of the audio signals to match the capabilities of the speaker's transducers; and optionally compensate for spectral anomalies of the speakers; and optionally compensate for spectral anomalies of the audio sources, (optionally by increasing and/or reducing the amplitude of the audio signal at particular frequencies). Further, the signal processor 64 is provided with an optional capability to compensate for the acoustic characteristics of the environment or listening space 5 into which the audio signals are output. The signal processor 64 may comprise one or more processing devices capable of performing functions to process the audio signals 100', 200', 300' when supplied to audio channels 10', 20', 30' of the signal processor 64 from the audio sources 1', 2', 3'.

The signal processor 64 optionally comprises a plurality of processing channels 10', 20', 30' each of which can be dynamically reconfigured so that it is able to perform specific processing of an audio signal 100', 200', 300' that has been assigned to that processing channel 10', 20', 30' by the audio controller unit 62. Each processing channel 10', 20', 30' of the audio system 11 may comprise a processing block 51', 52', 53'. Each processing block 51, 52, 53 may perform a series of functions or processes, (optionally arranged in one or more sub-blocks), which may comprise one or more or a bank of filters, which may include one or more or a combination of: a finite impulse response (FIR) filter and an infinite impulse response (IIR) filter and/or other functions comprised in sub-blocks, for example delay block, gain block, matrix encoders/decoders, bandwidth expanders and mixers. The series of functions or processes performed by each processing block 51', 52', 53' may be defined by a set of processing settings 12', 212', 312'. The processing settings 12', 212', 312' may be stored in the signal processor memory 66 and/or in the memory associated with the audio controller unit 62. The processing settings 12', 212', 312' may be used by any of the processing blocks 51', 52', 53' of any of the processing channels 10', 20', 30' to configure the processing block 51', 52', 53' of a processing channel 10', 20', 30', each time an audio signal 100', 200', 300', from a different audio source 1', 2', 3', is assigned to that processing channel 10', 20', 30'. The processing settings 12', 212', 312' of each processing block 51', 52', 53' of each processing channel 10', 20', 30' may be configured specifically for the type of audio signal 100', 200', 300' that can be assigned to a processing channel 10', 20', 30' and therefore the audio system 11 stores or has access to processing settings 12', 212', 312' that are appropriate for or tailored to each type of audio signal 100', 200', 300' and/or audio source 1', 2', 3' that is supported by the audio system 11. The processing settings 12', 212', 312' that may optionally be stored in one or more memories associated with the signal processor 64 and/or audio controller unit 62 may be updated and/or changed to reconfigure the audio system 11 so that the system 11 can support a new type of audio signal and/or a new audio source.

In the example illustrated by FIG. 1, the control unit 62 has permitted requests to output audio signals 100' and 200'. The signal processor 64 is configured to process the audio signals 100', 200'. To do this, the signal processor 64 is configured to assign appropriate processing settings 12', 212' to the processing blocks 51', 52' of the respective processing channels 10', 20' to which the permitted audio signals 1', 2' have been assigned. Additionally or alternatively the audio controller unit 62 may assign the processing settings 12', 212' (that are appropriate for the audio signals 1', 2') to the processing blocks 51', 52' of the respective processing channels 10', 20'. The audio controller unit 62 may be in some embodiments configured to carry out the selection of appropriate processing settings, immediately after the audio controller unit 62 has assigned the permitted audio signals 1', 2' to respective ones of the processing channels 10', 20'. Alternatively, the audio controller unit 62 and/or signal processor 64 may issue to the processing blocks 51', 52' of the processing channels to which the new audio signals 100', 200' have been assigned, the identity of those audio signals 100', 200' and/or the identity of the appropriate settings 12', 212'. The processing blocks 51', 52', 53' may then be configured to determine, find or retrieve the appropriate processing settings from a memory directly. The signal processor 64 may optionally download or otherwise retrieve the required appropriate processing settings 12', 212' from the signal processor memory 66 associated with the signal processor 64. The instructions executed by the signal processor 64 may optionally point to the required processing settings 12', 212' in the signal processor memory 66.

Figure 2:
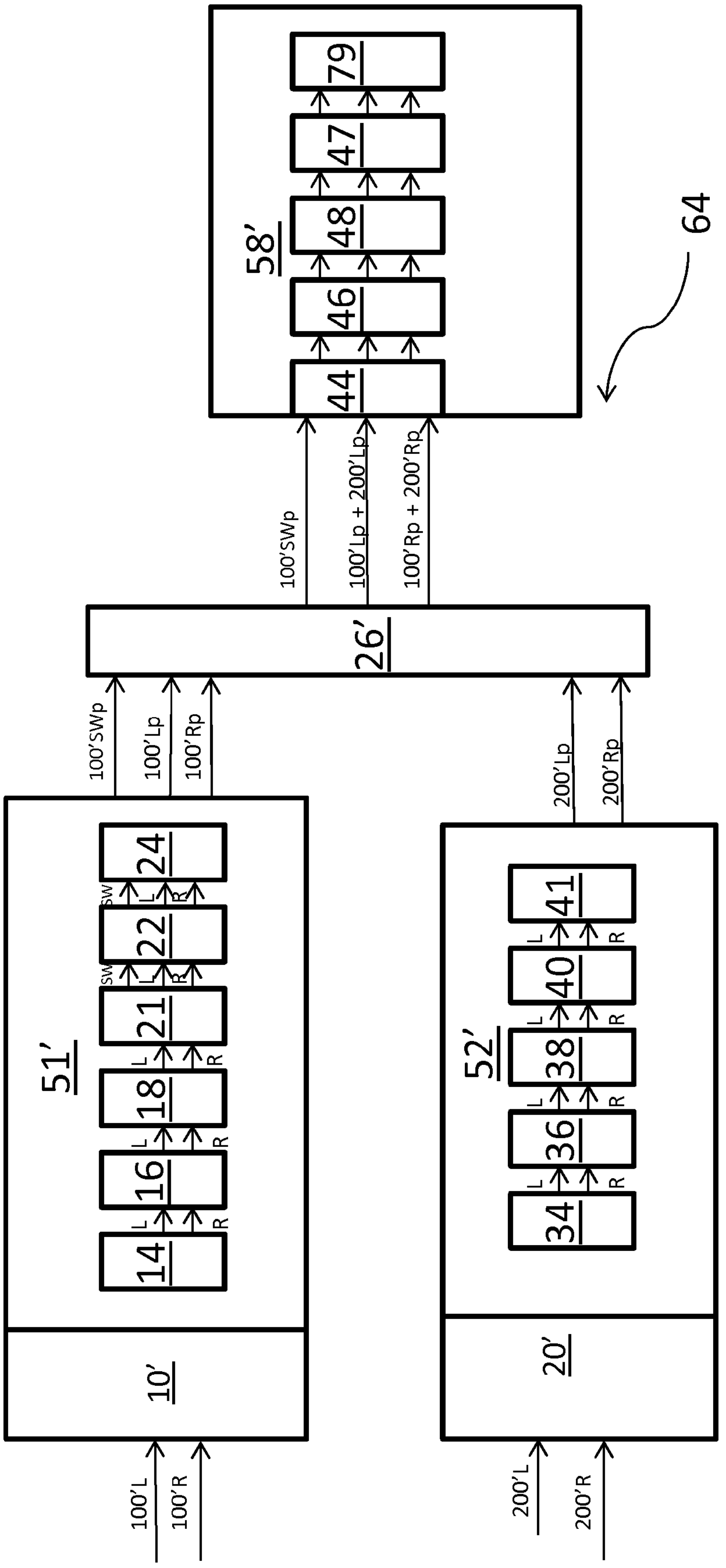
FIG. 2 is a block diagram illustrating a portion of the audio system of FIG. 1.

Referring now to FIG. 2, a block diagram of a signal processor 64 is illustrated. An audio signal 100' from the first audio source 1' has been assigned (by the audio controller unit 62) to the first processing channel 10'. Therefore the signal processing block 51' associated with that first processing channel 10' is assigned the stored processing settings 12' that are specific and appropriate for the identity of audio signal 100'. Similarly, the audio signal 200' from the second audio source 2' has been assigned (by the audio controller unit 62) to the second processing channel 20'. Therefore the signal processing block 52' associated with that channel 20' is assigned the stored processing settings 212' that are specific to and appropriate for the identity of audio signal 200'. It will be recognised that a benefit of the audio system 11 is that each audio signal, having an individual identity, may be processed prior to reproduction at one or more of the system speakers 60*a*, 60*b* using any of the processing channels 10', 20', 30'. Each audio source is not pre-assigned to a processing channel 10', 20', 30', but rather is dynamically assigned to a processing channel 10', 20', 30' as a demand to output an audio signal arises. The audio system 11 is configured to then adapt, modify or re-configure the processing blocks 51', 52', 53' associated with a processing channel so that the processing blocks 51', 52', 53' can optimise the quality of any audio signal that is assigned to it. As such, the processing channels have the capability to process any audio signal based upon the identity of the audio signal at any time. Additionally, the processing channels have the capability to change the characteristics of the processing sequence that they perform in order to ensure that the processing performed is appropriate to a newly assigned audio signal of different identity. As such the audio system 11 may support a far greater number of audio sources than current audio systems. Optionally two or more of the audio signals are individually processed using settings specific to their identity. The audio signal identity may optionally be determined by one or more of: the type or format of the digital audio signal, (for example compressed, uncompressed, MP3, WAV); and the source of the audio signal, (for example, CD, radio, telephone, satellite navigation system, parking sensor) and/or an identified contained in a header of a digital audio signal.

Each signal processing block 51', 52', of each processing channel 10', 20' may optionally comprise one or more processing sub-blocks, 14, 16, 18, 21, 22, 24; 34, 36, 38, 40, 41. The processing settings 12', 212' for each signal processing block 51', 52' of each processing channel 10', 20' may optionally comprise one or more or a series of settings 12', 212', for the one or more of the processing blocks, 14, 16, 18, 21, 22, 24; 34, 36, 38, 40, 41 respectively.

Each processing sub-block 14, 16, 18, 21, 22, 24; 34, 36, 38, 40, 41 is provided to manipulate one or more characteristics of an incoming audio signal 100', 200'. The processing sub-blocks 14, 16, 18, 21, 22, 24; 34, 36, 38, 40, 41 are optionally separate sets of instructions each for performing a certain function on an incoming audio signal stream 100', 200'. The settings downloaded, pointed to, referenced by or otherwise used by each signal processing block 51', 52' may provide the settings defining the operational signal processing functionality of one or more of the processing sub-blocks 14, 16, 18, 21, 22, 24; 34, 36, 38, 40, 41.

For example, the processing settings 12' that are optimised for an audio signal 100' of a first type optionally define the operational signal processing functionality of: a smart fader and balance block 14 (which may be used to re-compress a surround sound signal that has been split into multiple audio signals for multiple speakers into a lower number of signals determined by the rate of fade or balance adjustment required by a user in controlling a fader and balance control button that may optionally be provided in the vehicle cabin); a dynamic equalisation control (DEC) block 16; an Equaliser block 18; a subwoofer extraction block 21; a delay block 22 and a gain block 24. As a preferred, yet optional aspect of the invention, the settings 12' that define the operational signal processing functionality of the DEC equalisation block 16 and/or Equaliser block 18 are stored in the memory associated with the signal processor 64. Individual stored settings 12', 212', 312', are defined for each identity (type and/or source) of audio signal 100', 200', 300' and so on that may be output by the audio system 11. Further optionally, the settings that define the operational signal processing functionality of the smart fader and balance block 14; subwoofer extraction block 21; delay block 22 and gain block 24 may not change dependent upon the type of audio signal 100', 200', 300' being processed and may be default settings used by each. Some or all of the processing blocks 51', 52', 53' of the audio system 11. Optionally, these default settings may be stored in the memory 66 associated with the signal processor 64 so that they can be adjusted according to manufacturer requirements. Additionally or alternatively, some or all of these default settings may be hard-coded into the instructions performed by the processing block 51', 52' of the audio system 11.

The processing settings 12', 212', 312' stored for a given audio signal 100', 200', 300' may define the operational signal processing functionality of more or fewer functions than those described. For example, where the incoming audio stream is a telephone voice signal, the stored settings for that audio signal may optionally comprise the settings for a telephone voice expander function and no smart fader and balance controlled by a user.

Any of the audio signals 100', 200', 300' provided by any of the sources 1', 2', 3' may comprise one or more components (also referred to as channels). The source 1', 2', 3' may provide more than one audio component (channel) in order to support stereo and surround sound rather than merely mono sound. Referring to the exemplary embodiment illustrated in FIGS. 1 and 2, the first audio signal 100' comprises two signal channels 100'L, 100'R. One signal channel 100'L is intended for a left speaker 60*a* and the other signal channel 100'R is intended for a right speaker 60*b*. During the signal processing of the first audio signal 100', a subwoofer signal 100'SW may optionally be extracted from the bass-line of that first audio signal 100' to generate three audio components (channels) 100'L, 100'R, 100'SW of first source audio 100' to be output by the left ('L'), right ('R') and subwoofer ('SW') speakers respectively. In the reference numerals used, the suffix L, SW, R is used to indicate that the audio signal channel (component) is intended for a particular speaker: left (L), subwoofer (SW) and right (R) respectively. The second audio signal 200' is also a stereo audio signal and also comprises two signal channels 200'L, 200'R for the left and right speakers 60*a*, 60*b* respectively. Optionally no sub-woofer extraction is including in the processing settings 212' for the second audio signal 200'. Whether a particular set of processing settings 212', 12' comprises a subwoofer extraction block or not is determined, in advance, when the processing settings 212', 12' for a particular identity of audio signal 100', 200' are configured. Indeed, in pre-determining the processing settings 12', 212' for each identity of audio signal that the audio system is may be required to support it can be decided what type of processing (for example delay, gain, fade, balance, equalisation, subwoofer extraction) will be performed on a particular audio signal in dependence upon the type and/or source of the audio signal for which the processing settings 12', 212' are being configured. More particularly, the processing settings 12', 212' for use by the audio system 11 are configured such that they can perform equalisation of an audio signal and adapt the frequency characteristic of an audio signal that is specifically appropriate to a particular type of audio signal and/or that is specifically appropriate to a particular type of audio source. In this way problems associated with applying a blanket equalisation filtering characteristic to all audio signals output by an audio system are avoided and the quality of all audio signals that are reproduced can be enhanced compared to known systems.

The first audio signal once output by the signal processor 64 comprises three processed signal channels 100'Lp, 100'Rp, 100'SWp. Optionally, the three processed signal channels 100'Lp, 100'Rp, 100'SWp are output directly to a mixing block 26'. The suffix 'p' is used to indicate that the audio signal referred to has been subjected to signal processing (in other words has been modified). The second audio signal 200', once output by the signal processor 64, optionally comprises only two signal channels 200'L, 200'R. Optionally the two processed signal channels 200'Lp, 200'Rp are output directly to the mixing block 26'.

At the mixing block 26' the three digitally processed signal channels 100'Lp, 100'Rp, 100'SWp from the first audio source 1' are each mixed or summed together with the digitally processed signal channels 200'Lp, 200'Rp from the second audio source 2'. Three audio signal channels intended for each of the left I', right 'R' and subwoofer 'SW' speakers of the audio system comprising both a high-quality background source audio element and a high-quality foreground source audio element are thereby created. The combined, modified signal elements have been labelled as 100'Lp+200'Lp, 100'Rp+200'Rp and 100'SWp respectively in (see FIG. 2).

The provision of at least two separate processing channels 10', 20' each having their own signal processing modules 51', 52', the processing settings 12', 212', for each of which can be selected and changed during operation of the audio system 11, so that they are specific to the type and/or source of the audio signal that has currently been assigned to a processing channel 10', 20', means that each audio signal is individually optimised to improve or enhance the quality of that audio before all of the processed audio signals are mixed together to generate the audio signal output channels. The combined sound output 100'Lp+200'Lp and 100'Rp+200'Rp respectively are therefore considered to be of a better quality and a better sound is produced than if the two signals 100', 200' are combined prior to them being subjected to signal processing. Of particular importance is the ability of the audio systems of the present disclosure to offer separate equalisation processing of audio signals before mixing. This, in contrast to known systems where only one equalisation characteristic, that would not necessarily be optimised for both signals 100', 200', would be used on both signals.

Prior to the mixed audio signals (100'Lp+200'Lp, 100'Rp+200'Rp, 100'SW) reaching the speakers of the audio system 60*a*, 60*b*, the three signal channels are optionally input to one or more further processing blocks. In the illustrated arrangement, the three signals (100'Lp+200'Lp, 100'Rp+200'Rp, 100'SWp), are input into a third signal processing block 58. The third signal processing block 58 is loaded with or refers to settings 42 that may be referred to as environment correction or system wide settings 42.

These environment correction or system wide settings 42 may be pre-configured to optimise the audio signal channels (100'Lp+200'Lp, 100'Rp+200'Rp, 100'SWp) for the listening environment 5 into which the composite audio signal channels (100'Lp+200'Lp, 100'Rp+200'Rp, 100'SWp) will be output. The environment correction settings 42 for this supplementary signal processing block 58 are provided to compensate for the acoustic characteristics of the listening environment 5 into which the audio is output. The environment correction settings 42 may be configured by selecting a particular series of filters and other processes. The audio system 11 may be issued with information (which information may be pre-programmed and/or provided to the audio system in real time) of certain environmental factors, for example, the audio system 11 may be pre-programmed with information about the rear speakers, because their position within the vehicle cabin 5 causes a reduction in the loudness of the audio output from those speakers and therefore the equalisation 44 and other settings 42 selected for the supplementary signal processing block 58 may accordingly affect an increase in the loudness of the sound to be played though those rear speakers. Similarly if the audio system 11 is installed in a vehicle and that vehicle has its sun-roof open then the acoustic environment into which the audio is being played will be affected and the audio system 11 of the invention can be configured so that the dynamically changeable settings 42 of the supplementary signal processing block 58 compensate for the sun-roof being open.

Figure 3:
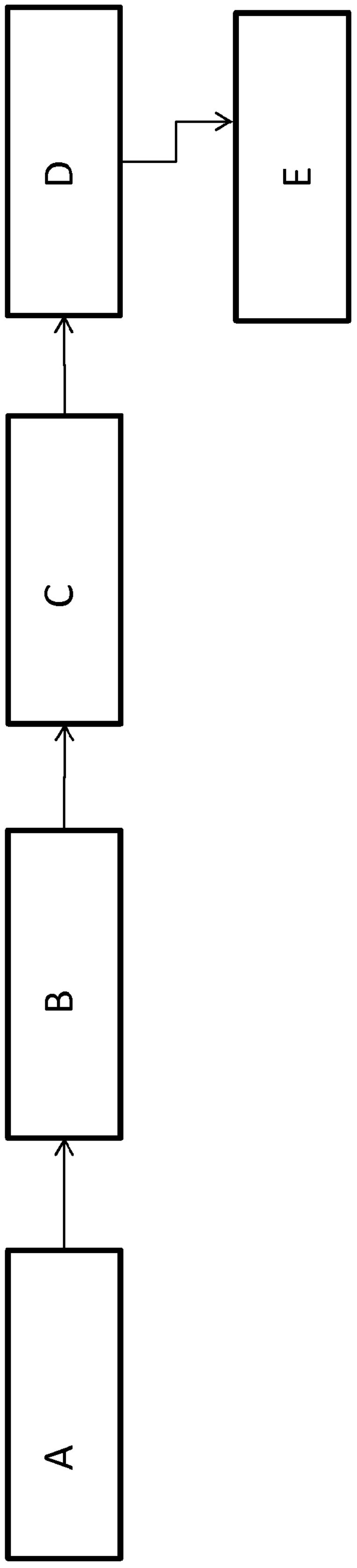
FIG. 3 is a flow diagram of the steps optionally taken by an audio system of FIG. 1.

In FIG. 3 a flow-diagram illustrating schematically the steps that may optionally be carried out by the audio controller unit 62 and/or signal processor 64 of the audio system 11 are shown. The optional steps are listed below and FIG. 3 provides an example of an order in which the steps and decisions may be carried out. Upon reviewing the descriptions of the steps below alongside FIG. 3 it will be understood how a program and/or one or more sets of instructions for the audio controller unit 62 and/or signal processor 64 may be configured in order to dynamically control and optimise multiple audio signals.

A: Receive request to play new audio signal;

B: Assign the new audio signal to a processing channel (either an available channel or one currently being used);

C: Identify the audio signal (optionally, by type, source and or quality);

D: Configure the processing block associated with the processing channel to which the new audio signal has been assigned using processing settings appropriate for the audio signal identity. (The processing settings are obtained or retrieved.)

E: Process the new audio signal in the assigned processing channel using a signal processing sequence characterised by the processing settings selected for that audio signal.

It will be understood that the audio system 11 of the present invention may administer, handle and process two or more incoming audio signals in a wide variety of ways. The arrangement illustrated in FIG. 3 provides an example of the way in which the administration of one incoming audio signal may be handled. At the same time, the audio system 11 may be configured to control and manage multiple other audio signals and is configured to perform separate, independent and specific processing of one or more additional audio signals.

For example, with reference to the audio system of FIG. 1, when the MP3 player audio signal 100' is assigned to the first processing channel 10', the processing block 51' associated with that first processing channel 10' is configured using appropriate processing, at least settings, for the equalisation blocks 14, 16, which processing settings tailor the equalisation blocks for an MP3 signal 100'. Subsequently, when the request to play the MP3 signal 100' ceases, the processing block 51' may remain configured for an MP3 signal 100'. Alternatively the processing settings may be cleared. Further alternatively, the processing block 51' may download or recall default settings selected from the memory in response to the MP3 signal 100' no longer being assigned to that first processing channel 10'. Further subsequently, a new demand to output a new audio signal may be placed upon the audio system 11. The audio system 11 is configured such that it will check availability to play that new audio signal. At least the first processing channel 10' is available and so the new audio signal may be assigned to that first processing channel 10'. Once the new audio signal type has been determined, new settings may need to be obtained from the memory 66 to process the new audio signal. Once the processing block 51' is appropriately configured to handle the new audio signal (optionally by having uploaded the appropriate processing settings into the processing sub-blocks), then the new audio signal can be processed and output in high-quality format. At the same time as these operations, a different audio signal may be assigned to the second processing channel 20' and similar processing operations may be carried out with respect to the second processing channel 20'. Once the two incoming audio signals have been individually and independently processed then they can be mixed together to generate a combined output signal. Whereas, the embodiment of FIG. 1 illustrates an audio system capable of individually and independently processing three incoming audio signals, it will be understood and it is envisaged that in other embodiments, the audio system is capable of playing a greater number of audio signals simultaneously.

Figure 4:
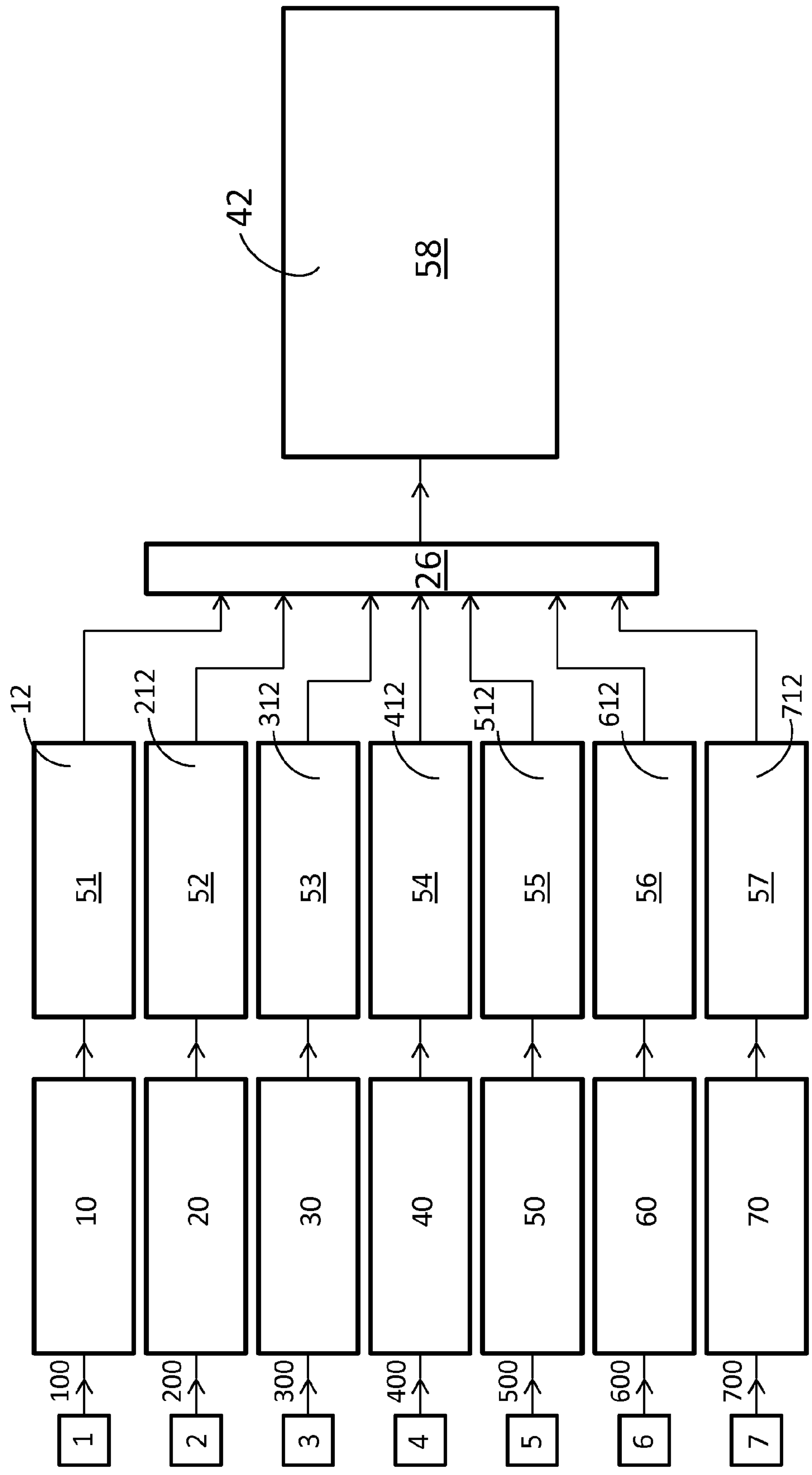
FIG. 4 is a block diagram illustrating a portion of an audio system according to another embodiment of the invention.

For example, in another embodiment of the invention illustrated schematically in FIG. 4, the audio system is optionally capable of simultaneously playing seven audio signals 100, 200, 300, 400, 500, 600, 700. The audio system has seven processing channels for processing seven audio signals simultaneously. The seven audio signals being simultaneously processed and output are selected from a plurality of potential audio signals comprising seven or more audio signals from seven or more audio sources. Each of the finite maximum selection of seven audio signals 100, 200, 300, 400, 500, 600, 700 may optionally be of a different or similar type of audio and from a different or similar audio source 1, 2, 3, 4, 5, 6, 7. Each of the seven processing channels 10, 20, 30, 40, 50, 60, 70 is optionally coupled to a separate signal processing block 51, 52, 53, 54, 55, 56, 57 and each signal processing block 51, 52, 53, 54, 55, 56, 57 can be dynamically altered, modified, or otherwise configured so that it provides an appropriate digital processing that is tailored to optimise the audio signal that has been dynamically assigned to that processing channel in dependence upon the identity of the assigned audio signal. Optionally, the dynamic reconfiguring is achieved by the processing block 51, 52, 53, 54, 55, 56, 57 recalling, downloading or looking-up settings defining the operational signal processing functionality required for the specific audio type being processed.

Alternatively, in some envisaged embodiments, the audio system is configured such that where more than one audio signal requires the same processing to be conducted then those audio signals may be grouped and assigned to the same processing channel. (This is described further below.)

If an audio signal 100 from a CD player is currently being played through a first channel 10 and channels 20 to 40 are being used for other audio signals, for example the audio signals from: a telephone 200, a traffic announcement system 300 and a satellite navigation system 400, three other channels are available if further audio signals need to be played. If a request is received by the audio system to output another audio signal 500, that new audio signal 500 may be assigned to an available channel, for example processing channel 50. The new audio signal 500 is subjected to processing 512 that is tailored to optimise the quality of that audio signal 500 before being mixed or combined at block 26 with the other processed signals **100*p*, 200*p*, 300*p* and 400*p***.

Optionally, each processing channel is reassignable in response to user demand. Additionally, the processing channels are dynamically assignable. This means that if the request to play the audio signal 300 input to the third processing channel 30 ends, that third processing channel 30 is available and a new audio signal can be assigned to it. When a new audio signal is assigned by the audio system to the third processing channel 30, the new audio signal will be identified and then based upon its identity (type, quality and/or source), the digital signal processing block 312 associated with the third processing channel 30 will be reconfigured so that it can carry out a specific signal processing (that optionally includes a specifically selected equalisation setting) that is tailored to suit the source of the new audio signal that has been assigned to that third processing channel 30. This dynamic reconfiguring of the DSP blocks and dynamic assignment of the channels on demand enables the audio system of the present invention to support a large number of potential audio sources. An audio system according to the invention is also able to optimise the quality of audio signals individually and independently if required and preferably, but nevertheless optionally, prior to mixing the audio signals together.

In the embodiment illustrated in FIG. 4, seven processing channels are available through which audio signals can be input and processed before being mixed to provide output audio signals that can be reproduced by speakers and/or headsets. There are a limited number of different audio sounds that a human can coherently listen to simultaneously. This may be in the region of seven and hence in some embodiments of the audio system of the invention a maximum of seven processing channels may be available. However it is envisaged that an audio system of the present invention may have fewer or greater number of processing channels, but preferably at least two channels and optionally sixty-four processing channels or more.

The audio system may have hard wired or wireless physical connections to a greater number of audio sources than it has processing channels and processing blocks.

Optionally in one embodiment of the invention, it is envisaged that the audio system can accommodate two or more audio signals from background type sources. Typically, these may be music signals originating from devices such as a CD player, radio, MP3 player, iPod® or these may be entertainment signals, originating from devices such as a DVD player, and smart phone. Whereas it is not normally required to have an audio system that can simultaneously process and output more than one audio signal from a background source at a time, the present invention provides an audio system that does allow for the output of more than one background source audio signal. For example, the audio system disclosed herein, in one envisaged embodiment, supports three background sources: two background audio signals for rear seat entertainment (RSE) devices for the rear-seat passengers; and a third background audio signal, for example, from a radio, for the driver and front passenger. Optionally, at least two of the separate audio signals may be delivered to head-phones or head-sets over a wired or wireless connection. The present invention provides an audio system capable of performing the individual processing and individual equalisation (using the same or different processing blocks and settings) of two or more background source audio signals. In such an embodiment the two or more background source audio signals are not mixed together but output separately to different speakers (for example, front of cabin and headsets). Each separate background audio may be, prior to being output, mixed with one or more foreground audio signals (that have each been individually processed), and/or subject to an environment correction processing 42.

Optionally in another envisaged embodiment of the invention, only some of the processing channels comprise processing blocks that are dynamically reconfigurable and others of the processing channels comprise processing blocks that use only default settings. The default settings may be stored in a memory and the logic performed by the processing blocks of the fixed-settings channels may be restricted to point only to those default fixed-settings. For example, the same fixed-settings 12 may be used by more than one processing block 51, 52, 53 associated with specific processing channels 10, 20, 30. The processing settings 12 may optionally define the operational signal processing functionality for audio signals originating from audio sources of the background type (for example music). For simplification of the processing of the audio system 11, the audio controller unit 62 may assign only background source type audio signals to those processing channels 10, 20, 30. The processing blocks 51, 52, 53 of those processing channels 10, 20, 30 are fixed and not dynamically reconfigurable. The remaining processing channels 40, 50, 60 etc. are however dynamically reconfigurable and specific settings 212, 312, 412 etc. may be pointed to, recalled or downloaded by the processing blocks 54, 55, 56 etc. associated with those dynamically reconfigurable channels 40, 50, 60 etc. so that they can each be tailored in dependence upon the identify of an audio source assigned thereto.

As a further example, five processing channels 10, 20, 30, 40, 50 may be fixed with the standard settings defining the operational signal processing functionality for background source audio signals (for example music). An incoming audio stream identified as coming from a background source by the audio controller unit 62 will be assigned to one of the "background source" processing channels 10, 20, 30, 40, 50. If an incoming audio signal is identified by the audio controller unit 62 as being a foreground source audio signal then it will be assigned to one of the "foreground audio" processing channels 60, 70, 80 and so on. The "foreground audio" processing channels 60, 70, 80 and so on are dynamically reconfigurable and the processing blocks 56, 57, 58 and so on can recall or point to one or more or a plurality of stored settings.

It can be appreciated that various changes may be made within the scope of the present invention, for example, the number, type and source of audio signal handled by the audio system of the present invention may be many and various. The audio system may be capable of handling incoming digital and analogue signals and may comprise one or more analogue to digital converters.

The identity of an audio signal may include information about the type of audio signal and/or the quality of the audio signal and/or the sources of the audio signal. The identity (for example type) of an audio signal is preferably determined prior to the assignment of that audio signal to a processing channel. In other arrangements the identity (for example type) of audio signal may not be determined until after the assignment of that audio signal to a processing channel.

In other embodiments of the invention it is envisaged that whereas the environment correction digital signal processing 42 is intended to compensate for the environment into which the audio is being played (for example, the cabin of a vehicle) and that the environment correction DSP 42 is therefore typically applied in a uniform manner and is therefore preferably applied after the input signals have been mixed together at the mixing block 26. In other envisaged embodiments, more than one environment correction DSP 42 block may be used. The environment correction DSP 42 may be performed on separate groups of signals; may be performed on individual signals or may be performed in conjunction with the bespoke DSP 12, 212, 312, 412, 512, 612, 712 specifically and dynamically set-up for each of the processing channels for incoming audio signals. Such configurations of audio systems have beneficial application for example where the environment into which the audio is being played has distinct acoustic properties in separate spatial sections and audio signals are to be played out of speakers in those separate sections. The environment correction DSP 42 may then not be the same for every audio signal it is required to play and environment correction DSP 42 may be performed on groups of signals or on individual signals. For example, in an envisaged application of the present invention (illustrated in FIG. 4), the audio system may be required to play the audio of a rear seat entertainment system (RSE) into speakers positioned within a rear spatial section of the cabin and may be required, simultaneously to play the audio from a portable music device only into speakers positioned within the front of the cabin. The environment correction DSP applied to the RSE system audio intended for the rear of the cabin only may be arranged specifically to account for the acoustic properties of the rear of the cabin and therefore may be applied only to the audio signals intended for the rear of the cabin. Similarly, a different, separate environment correction DSP may be applied to the portable music device audio (and any additional foreground source audio signals) intended only for the front of the cabin. As such it is envisaged that as well as having DSP blocks dynamically created to suit a specific incoming audio signal prior to the mixing of those incoming audio signals, in some embodiments the audio system of the present invention may comprise one or more environment correction DSP blocks to be available. Optionally in certain circumstances (for example a user mode requesting separate and distinct rear cabin and front cabin audio) the DSP blocks may be dynamically assigned to suit the acoustic properties of the environment into which groups of audio signal are to be played (for example a first environment correction DSP for all front cabin intended audio and a second environment correction DSP for all rear cabin intended audio).

Additionally, or alternatively, in some embodiments it is envisaged that the audio system comprises more than one mixing block. In such embodiments, more than two audio signals may be combined by two or more mixing blocks. For example, after processing each of four audio signals, two mixing blocks may be used to combine the processed audio signals. As such, the audio system may output two separate output audio signals. Optionally, a first of the output audio signals may be issued to a first set of speakers (for example front speakers) and a second of the output audio signals may be issued to a second set of speakers (for example rear speakers). In such arrangements, the processed audio signals may be combined in groups of different number or in groups of similar number.

The following list of types of audio signal source that may be accommodated is illustrative only and does not in any way represent an exhaustive list of all audio signals that may be handled: [radio, C.D. player, DVD player, Blu-Ray Player, smart phone, telephone, satellite navigation system, parking aid system, travel announcement system, vehicle (external) diagnostic system, audio system (internal) diagnostic system, DAB (Digital Audio Broadcasting Radio, FM/AM Radio, Video, Camera).

The aforementioned types of audio signal that may be accommodated is illustrative only and does not in any way represent an exhaustive list of all audio signals that may be handled.

It will be recognised that the handling and processing of incoming audio signals by an apparatus of the audio system, (which apparatus may optionally be referred to as an amplifier) are steps conducted by a processor optionally in conjunction with an executable program. The exact structure and arrangement of the program and manner in which digital audio signals are operated on may take many and various formats and optionally more than one processing apparatus and/or accessible memory may be provided.

The invention claimed is:

1. An audio system for a vehicle, the system being configured for reproducing audio signals and comprising:

- a signal processor having a finite maximum number of processing channels, said finite maximum number being at least two; and
- an audio controller unit configured to dynamically assign each of a plurality of audio sources to separate ones of the processing channels in response to requests received by the audio system to reproduce the audio signals from the audio source,
- wherein the audio system is configured to be simultaneously connected, via the audio controller, to a number of audio sources that exceeds the maximum number of processing channels;
- wherein each of the audio signals are labeled so that the audio system is capable of determining an identity of the audio signal;
- wherein the signal processor is configured to automatically select, in dependence upon the identity of each of the at least two audio signals assigned to the at least two processing channels, processing settings appropriate for each of the at least two audio signals assigned to the at least two processing channels that are for use by the signal processor in independently processing each of the at least two audio signals in each of the processing channels prior to combining at least two of said at least two audio signals; and
- wherein the audio system is configured to change the processing settings for a processing channel in response to a change in the identity of the audio signal assigned to that processing channel.

2. The audio system of claim 1, wherein each of the appropriate processing settings defines the filtering characteristics of one or more filters of an equalisation sub-block used by the signal processor in independently processing each of the at least two audio signals to adopt the frequency response of the audio signal, such that each of the at least two audio signals is subjected to equalisation processing according to its type and/or source.

3. The audio system of claim 1, wherein the audio system comprises: two or more audio sources for generating the at least two audio signals; and one or more memories accessible by the signal processor for storing processing settings appropriate to the two or more audio sources and/or to the identity of the at least two audio signals generated by the audio sources.

4. The audio system of claim 3, wherein each of said processing channels comprises a processing block and wherein the signal processor is configured to retrieve two or more processing settings from the one or more memories, which two or more processing settings are usable by the respective processing blocks of the at least two processing channels for independently processing the audio signals assigned to the at least two processing channels.

5. The audio system of claim 4, wherein the processing block of each processing channel comprises a sequence of sub-blocks, which sequence of sub-blocks comprises one or more of: a dynamic equalisation control (DEC) block; a filter block; a subwoofer extraction block; a delay block; a telephone expander block; a gain block; a surround sound decoder; and a bandwidth expander block.

6. The audio system of claim 5, wherein the processing block of each processing channel comprises a sequence of filter sub-blocks and wherein the processing settings for each of the processing blocks determine: the number of filter sub-blocks; the type of filter sub-blocks; the order of the sequence of the filter sub-blocks; and/or the characteristics of the filters of the filter sub-blocks.

7. The audio system of claim 1, comprising a plurality of speakers, wherein the at least two audio signals, after processing, are modified audio signals and the modified audio signals are combined before being issued to and reproduced by at least one of the plurality of speakers of the audio system.

8. The audio system of claim 1, wherein the audio controller is configured to select, from said requests to reproduce audio signals, which audio signals will be reproduced by the audio system and is configured to assign those selected audio signals to respective ones of the at least two processing channels.

9. The audio system of claim 1, wherein the identity of an audio signal comprises information relating to the type and/or source and/or quality of the audio signal and wherein the identity is determined by recognition of the type or format of the audio signal; recognition of the source of the audio signal; and/or reading an identifier contained in a header of a digital audio signal.

10. A method of processing audio signals in an audio system of a vehicle, wherein the audio system comprises a signal processor having finite maximum number of processing channels, said finite maximum number being at least two, and an audio controller unit configured to dynamically assign each of a plurality of audio sources to one of the processing channels of the signal processor in response to requests received by the audio system to reproduce the audio signals from the audio source, the method comprising:

- receiving at least two separate audio signals from at least two audio sources;
- determining the identity of the audio signal using labels of the audio signals and using the labels to select the appropriate processing settings;
- assigning each of the at least two separate audio signals to separate ones of the processing channels;
- automatically selecting, in dependence upon the identity of the at least two audio signals assigned to the processing channels, appropriate processing settings for each of the at least two audio signals of each processing channel;

independently processing each of the at least two audio signals using the appropriate processing settings prior to combining at least two of said at least two audio signals;

automatically changing the selection of the processing settings for a processing channel in response to a change in the identity of an audio signal assigned to that processing channel;

wherein the audio system is configured to be simultaneously connected, via the audio controller, to a number of audio sources that exceeds the maximum number of processing channels.

11. The method of claim 10, wherein each of the processing settings defines the filtering characteristics of one or more filters of an equalisation sub-block that is appropriate to the type and/or source and/or quality of an audio signal supported by the audio system such that each of the at least two audio signals is subjected to equalisation processing according to its type and/or source and/or quality.

12. The method of claim 10, wherein each of the processing channels comprises a processing block and wherein the two or more appropriate processing settings are used in respective processing blocks of the processing channels for independently processing the audio signal assigned to each of the processing channels.

13. The method of claim 12, further comprising configuring the processing block of each processing channel with a sequence of sub-blocks, which sequence of sub-blocks comprises one or more of a dynamic equalisation control (DEC) block; a filter block; a subwoofer extraction block; a delay block; a telephone expander block; a gain block; a surround sound decoder; and a bandwidth expander block.

14. The method of claim 13, wherein configuring a processing block comprises arranging a sequence of filter sub-blocks according to the processing settings selected for the processing block which determine: the number of filter sub-blocks; the type of filter sub-blocks; the order of the sequence of the filter sub-blocks; and/or the characteristics of the filters of the sub-blocks.

15. An apparatus for use in an audio system, the apparatus comprising a signal processor having at least two processing channels, an audio controller, and a program executable by the signal processor, the program configured such that when running on the apparatus, the apparatus is configured to implement the method of claim 10.

16. The apparatus of claim 15, wherein the apparatus is configured for connection to a plurality of audio sources and wherein the connection(s) to the audio sources may be any one or a combination of wired and wireless connections.

17. A non-transitory computer-readable medium having stored therein a program comprising instructions that, when executed by a signal processor, cause the audio system to implement the method of claim 10.

18. The non-transitory computer-readable medium of claim 17, wherein the program instructions are configured to determine the type and/or source of each audio signal assigned to a processing channel and configured to obtain processing settings appropriate to the type and/or source of each audio signal assigned to a processing channel by recalling data from one or more memories associated with the audio system or by referring to data held in one or more look-up tables contained in said program, in an auxiliary program or in one or more memories associated with the audio system.

19. A vehicle comprising the audio system of claim 1.

20. The vehicle of claim 19, wherein a plurality of internal audio sources and/or ports for external audio sources are coupled to a network within the vehicle, wherein an audio controller is coupled to the network for selecting which of one or more requests to reproduce an audio signal from the internal or external audio sources will be accepted and for assigning the audio signal associated with each accepted request to a separate processing channel of the signal processor of the audio system.

21. An apparatus comprising a non-transitory computer-readable medium having stored therein a program comprising instructions configured to carry out the method of claim 10.

22. A non-transitory computer-readable medium having stored therein a program comprising instructions that, when executed by at least one processor, are configured to carry out the method of claim 10.

* * * * *